United States Patent
Ito et al.

(10) Patent No.: US 12,253,430 B2
(45) Date of Patent: Mar. 18, 2025

(54) VALVE DIAGNOSIS APPARATUS, VALVE APPARATUS, AND VALVE DIAGNOSIS METHOD

(71) Applicant: YOKOGAWA ELECTRIC CORPORATION, Musashino (JP)

(72) Inventors: Shumpei Ito, Musashino (JP); Yoshiaki Tanaka, Musashino (JP)

(73) Assignee: YOKOGAWA ELECTRIC CORPORATION, Musashino (JP)

( * ) Notice: Subject to any disclaimer, the term of this patent is extended or adjusted under 35 U.S.C. 154(b) by 1012 days.

(21) Appl. No.: 16/972,607

(22) PCT Filed: May 16, 2019

(86) PCT No.: PCT/JP2019/019563
§ 371 (c)(1),
(2) Date: Dec. 7, 2020

(87) PCT Pub. No.: WO2019/244528
PCT Pub. Date: Dec. 26, 2019

(65) Prior Publication Data
US 2021/0247268 A1     Aug. 12, 2021

(30) Foreign Application Priority Data
Jun. 20, 2018 (JP) ................. 2018-116616

(51) Int. Cl.
*G01M 13/003* (2019.01)
*F16K 37/00* (2006.01)
*G01N 29/11* (2006.01)

(52) U.S. Cl.
CPC ....... *G01M 13/003* (2019.01); *F16K 37/0066* (2013.01); *F16K 37/0083* (2013.01); *G01N 29/11* (2013.01)

(58) Field of Classification Search
CPC .............. G01M 13/003; F16K 37/0066; F16K 37/0083; G01N 29/11
See application file for complete search history.

(56) References Cited

U.S. PATENT DOCUMENTS 4,699,007 A * 10/1987 Kawashima ........... G01N 29/26
                                                            73/625
4,920,802 A       5/1990 McMullin et al.
(Continued)

FOREIGN PATENT DOCUMENTS
EP        0646745 A1    4/1995
JP        S60215182 A    10/1985
(Continued)

*Primary Examiner* — Eman A Alkafawi
*Assistant Examiner* — Dilara Sultana
(74) *Attorney, Agent, or Firm* — KENJA IP LAW PC

(57) ABSTRACT

The present disclosure provides a valve diagnosis apparatus capable of being combined with an existing valve and of automatically diagnosing corrosion, a valve apparatus using this valve diagnosis apparatus, and a valve diagnosis method. A valve diagnosis apparatus of the present disclosure includes an ultrasonic transmitter that transmits ultrasound towards a valve element that opens and closes a valve to be diagnosed, an ultrasonic receiver that receives the ultrasound transmitted from the ultrasonic transmitter, a controller that drives the ultrasonic transmitter and processes a reception signal received by the ultrasonic receiver, and a memory that stores the reception signal. The controller detects corrosion of the valve element from the difference in intensity of the reception signal in the initial state of the valve and at the time of diagnosis.

20 Claims, 6 Drawing Sheets

(56) References Cited

U.S. PATENT DOCUMENTS

| | | | |
|---|---|---|---|
| 4,977,778 | A | 12/1990 | Nafziger et al. |
| 5,224,512 | A | 7/1993 | Nogami et al. |
| 5,228,342 | A | 7/1993 | McShane |
| 5,257,545 | A | 11/1993 | Au-Yang |
| 7,940,189 | B2 * | 5/2011 | Brown ................ F16K 37/0075 |
| | | | 340/605 |
| 9,587,461 | B1 | 3/2017 | Jaffrey et al. |
| 2003/0019297 | A1 | 1/2003 | Fiebelkorn et al. |
| 2015/0059886 | A1 | 3/2015 | Anderson |
| 2015/0068311 | A1 * | 3/2015 | Tanaka ................... G01N 17/00 |
| | | | 73/629 |
| 2019/0369056 | A1 * | 12/2019 | Li ........................ G01N 29/043 |

FOREIGN PATENT DOCUMENTS

| | | | |
|---|---|---|---|
| JP | H01124739 A | | 5/1989 |
| JP | H05195714 A | | 8/1993 |
| JP | H0694160 A | | 4/1994 |
| JP | 2868861 B2 * | | 3/1999 |
| JP | 2004271281 A | | 9/2004 |
| JP | 2005325978 A | | 11/2005 |
| JP | 2010054434 A * | | 3/2010 |
| JP | 2012251835 A * | | 12/2012 |
| JP | 2015184028 A | | 10/2015 |
| JP | 5940350 B2 * | | 6/2016 |
| JP | 2017125727 A * | | 7/2017 |
| JP | 6289195 B2 * | | 3/2018 |
| WO | 2016123356 A1 | | 8/2016 |

\* cited by examiner

VALVE DIAGNOSIS APPARATUS, VALVE APPARATUS, AND VALVE DIAGNOSIS METHOD

CROSS-REFERENCE TO RELATED APPLICATION

The present application claims priority to and the benefit of Japanese Patent Application No. 2018-116616 filed Jun. 20, 2018, the entire contents of which are incorporated herein by reference.

TECHNICAL FIELD

The present disclosure relates to a valve diagnosis apparatus, a valve apparatus, and a valve diagnosis method.

BACKGROUND

Fluids that include solids such as sand may flow at high speed inside various types of valves used in flow control and the like of oil and gas. Such solids collide against the valves, leading to corrosion of parts.

To address this problem, patent literature (PTL) 1, for example, discloses a way of diagnosing corrosion in a multiple orifice valve by monitoring the pressure of an outer depressurized cavity 92, between a bean 78 and a valve body 12, through a pressure port 98.

CITATION LIST

Patent Literature

PTL 1: WO2016/123356

SUMMARY

Solution to Problem

A valve diagnosis apparatus according to an embodiment includes an ultrasonic transmitter configured to transmit ultrasound towards a valve element configured to open and close a valve to be diagnosed, an ultrasonic receiver configured to receive the ultrasound transmitted from the ultrasonic transmitter, a controller configured to drive the ultrasonic transmitter and process a reception signal received by the ultrasonic receiver, and a memory configured to store the reception signal. The controller is configured to detect corrosion of the valve element from a difference in intensity of the reception signal in an initial state of the valve and at a time of diagnosis.

DETAILED DESCRIPTION

Technical Problem

Figure 1:
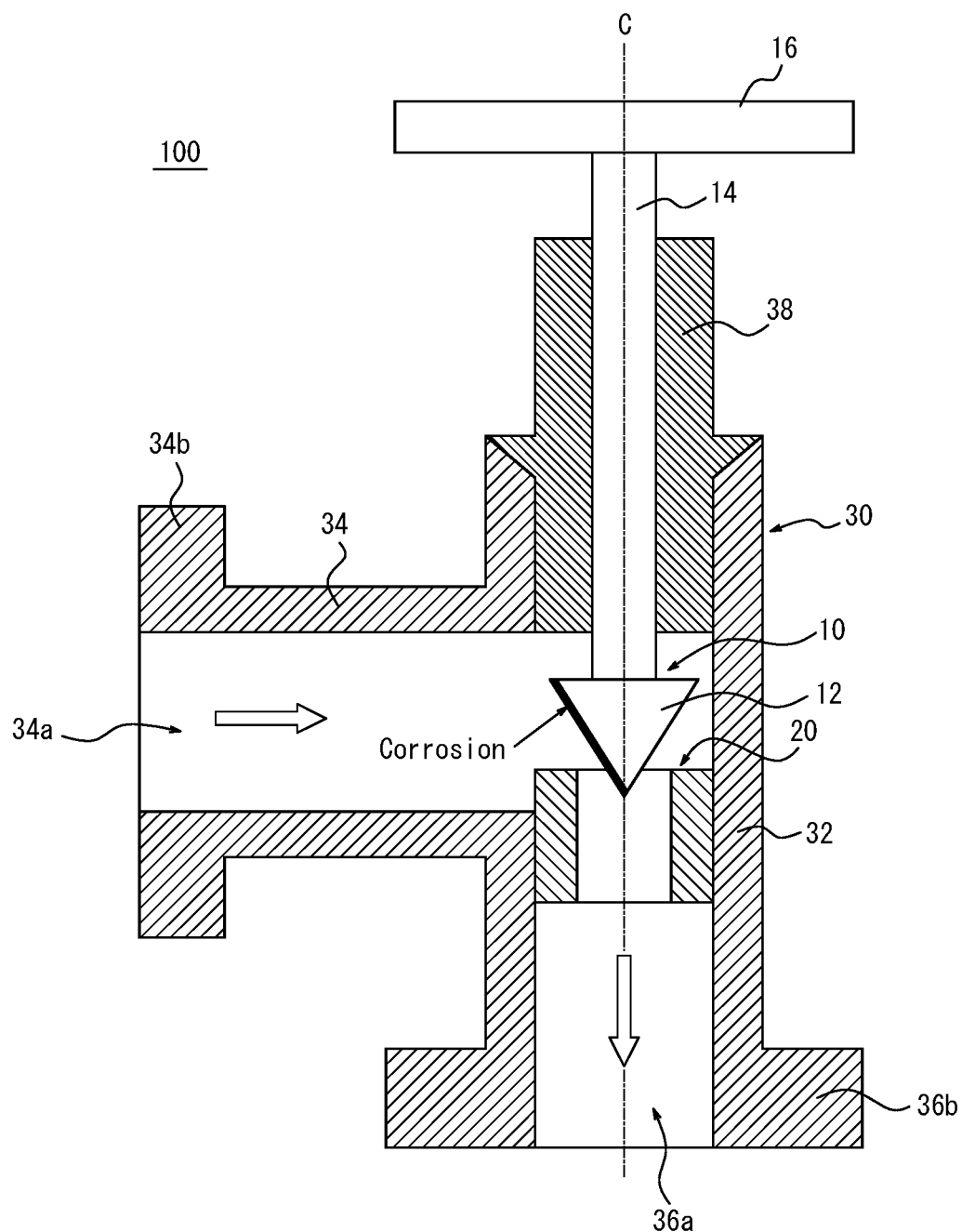
FIG. 1 is a cross-section of a valve used in combination with a valve diagnosis apparatus according to an embodiment of the present disclosure.

In the valve in PTL 1, however, the pressure of the outer depressurized cavity 92 between the bean 78 and the valve body 12 needs to be kept independent from the pressure inside the valve by cavity seals 94, 96. This requires the production of a valve with a special structure. The diagnosis technique disclosed in PTL 1 therefore cannot be subsequently applied to an existing valve or a valve that is already operating in a factory.

The present disclosure aims to resolve this problem by providing a valve diagnosis apparatus capable of being combined with an existing valve and of automatically diagnosing corrosion, a valve apparatus using this valve diagnosis apparatus, and a valve diagnosis method.

Solution to Problem

A valve diagnosis apparatus according to an embodiment includes an ultrasonic transmitter configured to transmit ultrasound towards a valve element configured to open and close a valve to be diagnosed, an ultrasonic receiver configured to receive the ultrasound transmitted from the ultrasonic transmitter, a controller configured to drive the ultrasonic transmitter and process a reception signal received by the ultrasonic receiver, and a memory configured to store the reception signal. The controller is configured to detect corrosion of the valve element from a difference in intensity of the reception signal in an initial state of the valve and at a time of diagnosis. This configuration enables detection of the amount of corrosion of the valve element by combining the valve diagnosis apparatus with an existing valve. Corrosion of the valve element in a valve already operating in a factory or the like, or in an existing valve product, can therefore be detected automatically. The cost of having operators, in the plant or the like where the valve is used, inspect the valve directly can also be reduced.

In an embodiment, the memory may be configured to store, in advance, a relationship between a degree of opening of the valve and an intensity of the reception signal in the initial state of the valve, and the controller may be configured to detect corrosion of the valve element from a difference in intensity of the reception signal in the initial state of the valve and at the time of diagnosis with respect to the same degree of opening of the valve. The difference in the reception signal intensity between the initial state and the time of diagnosis is thought to correlate with the amount of corrosion of the valve element. This configuration enables quantification of this difference in intensity, thereby enabling more accurate detection of the amount of corrosion of the valve element.

In an embodiment, the valve diagnosis apparatus may further include a plurality of ultrasonic transmitters and a plurality of ultrasonic receivers configured to receive ultrasound transmitted from the plurality of ultrasonic transmitters; the memory may be configured to store, in advance, a relationship between a degree of opening of the valve and an intensity of a plurality of reception signals from the plurality of ultrasonic receivers in the initial state of the valve; and the controller may be configured to detect corrosion of the valve element from a difference in intensity of at least a portion of the plurality of reception signals in the initial state of the valve and at the time of diagnosis with respect to the same degree of opening of the valve. This configuration enables selection and use of the reception signal intensity, among the plurality of reception signal intensities from the plurality of ultrasound receivers, that is highly correlated with corrosion of the valve element. The amount of corrosion of the valve element can therefore be detected more accurately.

In an embodiment, the at least a portion of the plurality of reception signals may be a reception signal received by an ultrasonic receiver, among the plurality of ultrasonic receivers, closest to a predetermined portion of the valve element at the time of diagnosis. This configuration enables selection and use of the reception signal, among the plurality of reception signals from the plurality of ultrasonic receivers, that is from the ultrasonic receiver closest to the needle, which is the portion of the valve element thought to be susceptible to corrosion due to fluid. The amount of corrosion of the valve element can therefore be detected more accurately.

In an embodiment, the controller may be configured to acquire information of the degree of opening of the valve by detecting a vertical position of a portion of the valve element not corroded by fluid. This configuration can reduce the effect of corrosion of the valve element on the information on the opening degree of the valve. The amount of corrosion of the valve element can therefore be detected more accurately based on more accurate information on the opening degree of the valve.

In an embodiment, the valve diagnosis apparatus may further include a data transmitter configured to transmit a detection result of corrosion of the valve element, and the controller may be configured to detect corrosion of the valve element at a predetermined cycle and transmit the detection result from the data transmitter to an external destination. With this configuration, information related to the corrosion of the valve element is periodically transmitted to the manager or the like of the plant. This facilitates maintenance of the plant.

In an embodiment, the valve diagnosis apparatus may further include a data transmitter configured to transmit information related to corrosion of the valve element, and the controller may be configured to detect corrosion of the valve element at a predetermined cycle and transmit a warning signal to an external destination from the data transmitter when a detection result exceeds a predetermined threshold. With this configuration, a warning signal indicating that the amount of corrosion of the valve element has exceeded a predetermined amount is transmitted to the manager or the like of the plant, enabling the manager to learn of an abnormality in the plant quickly.

A valve apparatus according to an embodiment includes a valve configured to control flow of a fluid by movement of a valve element, an ultrasonic transmitter configured to transmit ultrasound towards the valve element, an ultrasonic receiver configured to receive the ultrasound transmitted from the ultrasonic transmitter, a controller configured to drive the ultrasonic transmitter and process a reception signal received by the ultrasonic receiver, and a memory configured to store the reception signal. The controller is configured to detect corrosion of the valve element from a difference in intensity of the reception signal in an initial state of the valve and at a time of diagnosis. This configuration enables automatic diagnosis of corrosion of the valve element in the valve. The cost of having operators, in the plant or the like where the valve is used, inspect the valve directly can also be reduced.

In an embodiment, the valve may be a needle-type valve including a tapered valve element. This configuration enables a portion of the ultrasound transmitted towards the needle of the valve element to be reflected by the needle while another portion passes by along the front and back sides of the needle and is received by the ultrasonic receiver. Accordingly, a reception signal corresponding to the size of the needle as viewed in the front-back direction can be received by the ultrasonic receiver. The amount of corrosion of the valve element can therefore be detected more accurately from the reception signal intensity.

A valve diagnosis method according to an embodiment includes receiving ultrasound transmitted towards a valve element and storing an intensity of a reception signal in an initial state of the valve, receiving ultrasound transmitted towards the valve element and acquiring an intensity of a reception signal at a time of diagnosis of the valve, calculating a difference in intensity of the reception signal in the initial state of the valve and at the time of diagnosis, and detecting corrosion of the valve element from the difference in intensity of the reception signal. This configuration enables automatic diagnosis of corrosion of the valve element 10 in the valve. The cost of having operators, in the plant or the like where the valve is used, inspect the valve directly can also be reduced.

Advantageous Effect

The present disclosure can provide a valve diagnosis apparatus capable of being combined with an existing valve and of automatically diagnosing corrosion, a valve apparatus using this valve diagnosis apparatus, and a valve diagnosis method.

Embodiments of the present disclosure are now described with reference to the drawings. First, a valve 100 used in combination with a valve diagnosis apparatus 300 according to the present embodiment is described. As illustrated in FIG. 1, the valve 100 includes a valve body 30 forming a flow path through which a fluid flows, a valve element 10 that controls the flow of the fluid by moving in the vertical direction of FIG. 1, and a valve seat 20 that restricts the flow of fluid between the valve element 10 and the valve seat 20 and blocks the flow of fluid by the valve element 10 sitting on the valve seat 20 from above.

The vertical direction of FIG. 1 is designated the vertical direction of the valve 100 in the present description, the scope of the patent claims, the abstract, and the drawings. The left side of FIG. 1 is designated the front side of the valve 100, and the right side of FIG. 1 is designated the back side of the valve 100. The direction perpendicular to the paper in FIG. 1 is designated the left-right direction of the valve 100. The central axis C in FIG. 1 is the common central axis of the valve element 10 and an outer tube 32 of the valve body 30, described below.

The initial state of the valve 100 in the present description, the scope of the patent claims, the abstract, and the drawings refers to a state in which no major wear has occurred in the valve element 10 and the like of the valve 100, and the valve 100 can operate normally.

As illustrated in FIG. 1, the valve body 30 includes the tubular outer tube 32 that extends in the vertical direction and houses the valve element 10 and the valve seat 20 therein, a flow tube 34 extending forward from the substantial central height of the outer tube 32 and forming an inlet 34a for fluid, and an inner tube 38 that fits onto the upper end of the outer tube 32 and supports the valve element 10 moveably in the vertical direction. In the illustrated example, the flow tube 34 is integrally formed with the outer tube 32. The inner tube 38 is a tubular member capable of housing a stem 14 of the valve element 10 therein. A female screw is formed on the inner circumferential surface of the inner tube 38 and is capable of screw engagement with a male screw formed on the outer circumferential surface of the stem 14.

As illustrated in FIG. 1, the valve element 10 includes a tapered needle 12 that decreases in diameter towards the bottom, a stem 14 that is a rod-shaped member extending in the vertical direction and that supports the needle 12 from above, and a handle 16 provided at the upper end of the stem 14 for rotating the valve element 10 about the central axis C. As described above, a male screw capable of screw engagement with the inner tube 38 is formed on the outer circumferential surface of the stem 14. The handle 16 can be rotated to move the valve element 10 in the vertical direction and adjust the degree of opening of the valve 100. An operator may rotate the handle 16 manually, or the handle 16 may be rotated automatically by another apparatus or the like.

The valve seat 20 is a hollow tubular member in the present embodiment and is fixed at a position enabling the needle 12, which has a substantially conical shape, to be seated from above at the position of intersection between the outer tube 32 and the flow tube 34, as illustrated in FIG. 1. By the handle 16 being rotated about the central axis C, the valve element 10 can be moved in the vertical direction to change the vertical distance between the needle 12 and the valve seat 20, thereby changing the flow of fluid flowing through the valve 100. The valve 100 closes when the outer circumferential surface of the needle 12 abuts against the inner circumferential surface of the valve seat 20 at the upper end thereof.

The valve 100 is opened when a gap is provided between the needle 12 and the valve seat 20 by rotation of the handle 16. When the valve 100 is open, the fluid flowing from the inlet 34a of the flow tube 34 proceeds to the intersection position with the outer tube 32, passes through the gap between the needle 12 and the valve seat 20, and further proceeds downward in FIG. 1, as indicated by the arrows in FIG. 1. The lower end of the outer tube 32 forms an outlet 36a for the fluid. The fluid subjected to flow control by the needle 12 and the valve seat 20 is ejected through the outlet 36a. A flange 34b is formed at the front end of the flow tube 34, and a flange 36b is formed at the lower end of the outer tube 32. The valve 100 can easily be connected to another flow path or the like using these flanges 34b, 36b.

Figure 2:
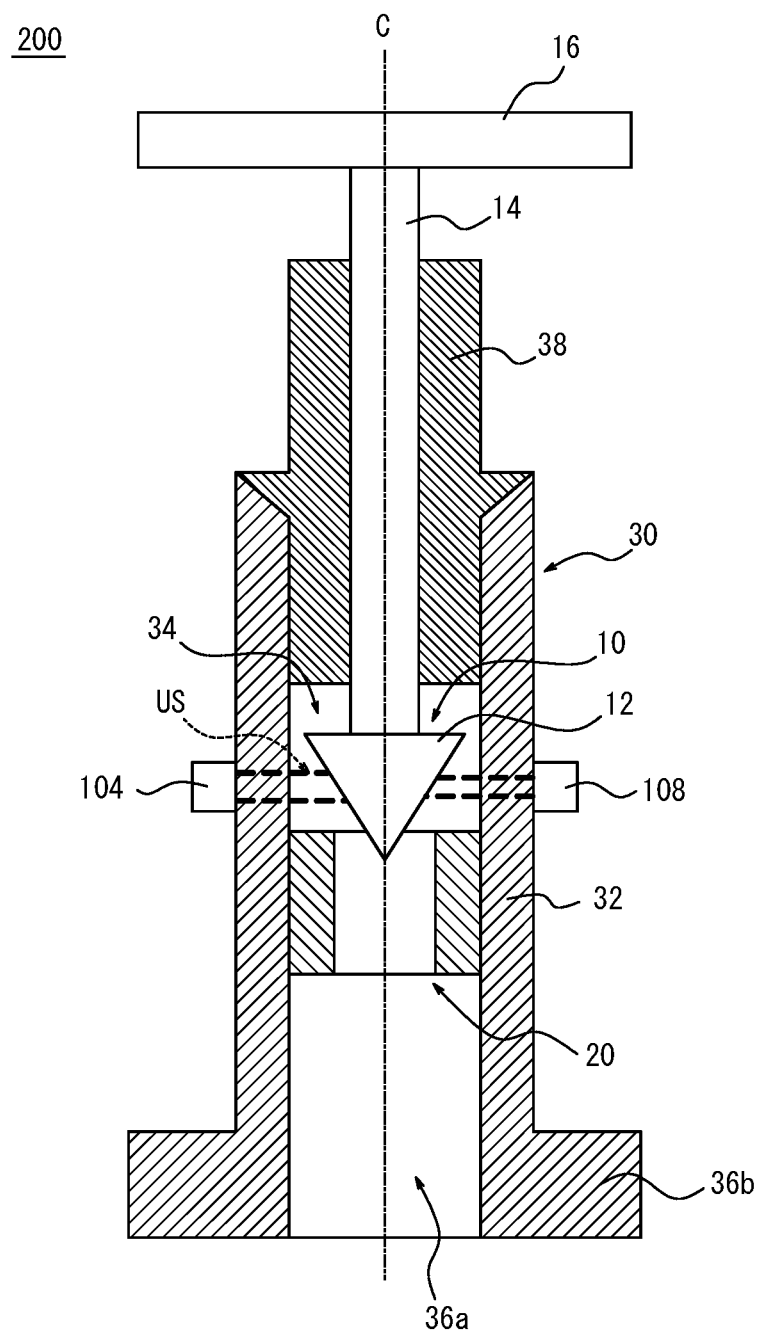
FIG. 2 is a cross-section of a valve apparatus, according to an embodiment of the present disclosure, in which the valve of FIG. 1 is combined with a valve diagnosis apparatus.

FIG. 2 illustrates the configuration of a valve apparatus 200, according to an embodiment of the present disclosure, in which the valve 100 of FIG. 1 is combined with the valve diagnosis apparatus 300. FIG. 2 illustrates the valve 100 of FIG. 1 as seen from the back side (the right side in FIG. 1). The vertical direction of FIG. 2 is the vertical direction of the valve apparatus 200. The direction from the surface of the paper in FIG. 2 towards the back is the front direction of the valve apparatus 200, and the direction from the surface of the paper in FIG. 2 towards the front is the back direction of the valve apparatus 200. The left-right direction in FIG. 2 is the left-right direction of the valve apparatus 200. Among the constituent elements of the valve diagnosis apparatus 300, only an ultrasonic transmitter 104 and an ultrasonic receiver 108 are illustrated in FIG. 2.

In the example in FIG. 2, the ultrasonic transmitter 104 and the ultrasonic receiver 108 are fixed to the outer tube 32 of the valve 100 at opposite positions sandwiching the needle 12 of the valve element 10 from the left and right. The ultrasound US transmitted by the ultrasonic transmitter 104 is preferably propagated towards the ultrasonic receiver 108 at a greater width than the width of the needle 12 in the front-back direction so that a portion of the ultrasound US is reflected by the needle 12, whereas another portion propagates through the needle 12 or passes by along the front and back sides of the needle 12 to reach the ultrasonic receiver 108. The ultrasonic transmitter 104 can be configured so that the ultrasound US transmitted by a piezoelectric element, for example, passes through an acoustic lens to ensure a predetermined directivity relative to the ultrasonic receiver 108.

Figure 3:
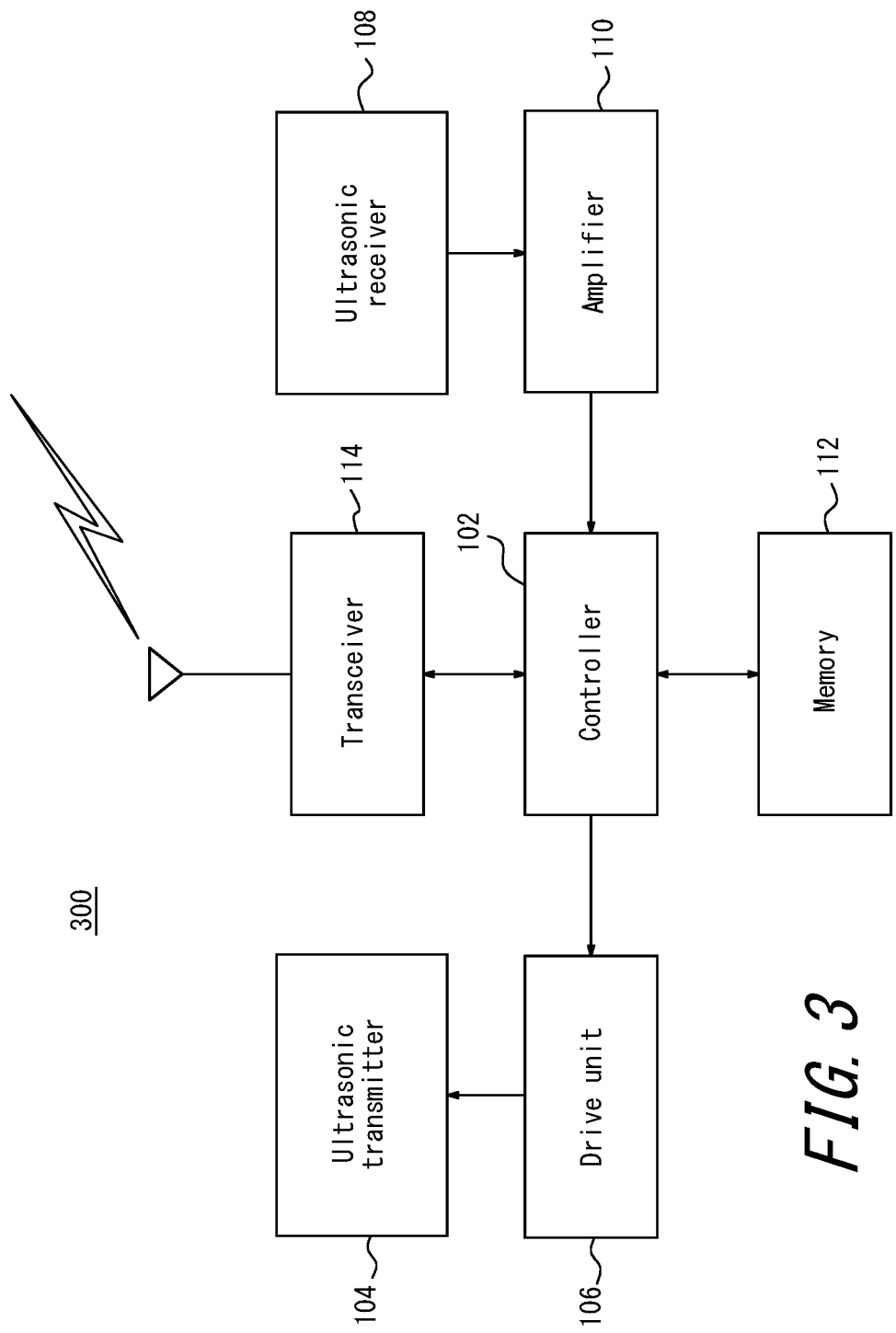
FIG. 3 is a block diagram illustrating the configuration of a valve diagnosis apparatus according to an embodiment of the present disclosure.

FIG. 3 is a block diagram illustrating the configuration of the valve diagnosis apparatus 300 according to the present embodiment. The valve diagnosis apparatus 300 includes the ultrasonic transmitter 104 and the ultrasonic receiver 108 also illustrated in FIG. 2, a controller 102 that performs drive control of the ultrasonic transmitter 104 and processes the reception signal received by the ultrasonic receiver 108, a drive unit 106 that supplies a drive voltage to the ultrasonic transmitter 104, an amplifier 110 that amplifies the reception signal received by the ultrasonic receiver 108, a memory 112 that stores the reception signal received by the ultrasonic receiver 108, and a transceiver 114 that performs data communication with another server, terminal, or the like.

The ultrasonic transmitter 104 includes a piezoelectric element that is driven by the drive voltage from the drive unit 106, based on the drive signal from the controller 102, to generate ultrasound US. The ultrasound US is a sound wave having a frequency exceeding 20 kHz and has sharper directivity than audible sound. Depending on the size and the like of the object at which the ultrasound US is aimed, the reception intensity of the ultrasound US received at a position opposite the ultrasonic transmitter 104 relative to the object varies. Accordingly, the size and the like of an object can be detected by reception, at the opposite side, of the ultrasound US transmitted towards the object.

The ultrasonic receiver 108 includes a piezoelectric element, is disposed at a position opposite the ultrasonic transmitter 104 relative to the needle 12, i.e. the object, as illustrated in FIG. 2, and receives the ultrasound US transmitted from the ultrasonic transmitter 104. The piezoelectric element is slightly displaced by the ultrasound US that reaches the ultrasonic receiver 108. This slight displacement produces voltage in the piezoelectric element, and the ultrasound US is received by detection of this voltage. The voltage detected by the piezoelectric element is amplified in the amplifier 110 by a predetermined amplification factor.

The controller 102 performs drive control of the ultrasonic transmitter 104 and processes the signal received by the ultrasonic receiver 108. In the present embodiment, the controller 102 outputs a drive signal with a frequency corresponding to the frequency of the ultrasound US to the drive unit 106 at the timing for diagnosis of the valve 100. Based on the drive signal from the controller 102, the drive unit 106 drives the ultrasonic transmitter 104 at a drive voltage suitable for driving of the piezoelectric element.

The controller 102 processes the reception signal of the ultrasound US received by the ultrasonic receiver 108 and amplified by the amplifier 110. The controller 102 processes the reception signal by, for example, saving the reception signal intensity (the peak value, the integrated value, and the like) in the memory 112 and/or transmitting the reception signal intensity to an external server, terminal, or the like via the transceiver 114. The controller 102 calculates the difference in intensity between the reception signal in the initial state and the reception signal at the time of diagnosis of the valve 100, detects corrosion of the valve element 10 based on the difference in intensity between the reception signals, and saves the detection result in the memory 112 and/or transmits the detection result to an external server, terminal, or the like via the transceiver 114. The controller 102 judges that the corrosion of the valve element 10 has exceeded a predetermined threshold when the intensity of the reception signal, or the difference in intensity of the reception signal in the initial state and at the time of diagnosis, exceeds a predetermined value. In this case, the controller 102 transmits a warning signal to an external server, terminal, or the like via the transceiver 114. The controller 102 can be configured by one or more of a central processing unit (CPU), application specific integrated circuit (ASIC), digital signal processor (DSP), programmable logic device (PLD), field programmable gate array (FPGA), microcontroller, or the like.

The memory 112 stores, in advance, the reception signal intensity and the like from the ultrasonic receiver 108 in the initial state of the valve 100 together with information related to the degree of opening of the valve 100. In other words, the reception signal intensity and the like in the initial state of the valve 100 is stored in the memory 112 for each degree of opening of the valve 100. A reception signal waveform, for example, may be stored in the memory 112 instead of the reception signal intensity, and the controller 102 may be configured to calculate the reception signal intensity using the reception signal waveform. Based on an instruction from the controller 102, the memory 112 stores the reception signal intensity at the time of diagnosis, or the difference in intensity of the reception signal in the initial state and at the time of diagnosis, and the like. The reception signal intensity in the initial state at the same degree of opening of the valve 100 as the degree of opening of the valve 100 at the time of diagnosis is used in the calculation of the difference in intensity of the reception signal in the initial state and at the time of diagnosis of the valve 100. The memory 112 can be configured by a semiconductor memory, a magnetic memory, an optical disc, or the like.

In the present embodiment, the controller 102 can acquire information on the degree of opening of the valve 100 from a non-illustrated flow meter, pressure gauge, or the like provided inside a plant, for example. In other words, the controller 102 can acquire information on the degree of opening of the valve 100 from the flow of the fluid flowing inside the valve 100. The controller 102 can also acquire information on the degree of opening of the valve 100 by acquiring vertical position information of the valve element 10. The vertical position information of the valve element 10 can be acquired by, for example, detecting the rotation angle of the handle 16 about the central axis C with a rotary encoder or the like or detecting the vertical position of the valve element 10 with a linear scale or the like. The information on the degree of opening of the valve 100 may also be inputted by an operator using a non-illustrated input interface of the valve diagnosis apparatus 300, or the information on the degree of opening of the valve 100 inputted from an external terminal may be received via the transceiver 114. The vertical position of a portion not corroded by the fluid is preferably detected during detection of the vertical position of the valve element 10.

The transceiver 114 is a functional unit for transmitting and receiving data between the controller 102 and the memory 112 on the one hand and a server, terminal, or various field devices other than the valve 100 on the other hand via the transceiver 114. In the present embodiment, the transceiver 114 is configured to be capable of wireless communication using a communication protocol defined by ISA100.11a, which is an industrial wireless standard.

Field devices, as used herein, refer to sensor devices such as pressure gauges, flow meters, and temperature sensors; valve devices, such as flow control valves and opening/closing valves; actuator devices, such as fans or motors; image capturing devices, such as cameras or video recorders, that capture images of the conditions and objects in the plant; acoustic devices, such as microphones that collect abnormal noises and the like inside the plant and speakers that emit warning sounds or the like; position detectors that output position information of various devices; and other such devices.

Examples of the plant in which the field devices are installed include an industrial plant such as a chemical plant; a plant for managing a well site, such as a gas field or oil field, and the surrounding area; a plant for managing power generation such as water power, thermal power, nuclear power, or the like; a plant for managing environmental power generation such as solar power, wind power, or the like; and a plant for managing water supply and sewerage, a dam, or the like.

The transceiver 114 may be configured to communicate using a wired or wireless communication protocol other than the aforementioned ISA100.11a, such as a communication protocol defined by HART® (HART is a registered trademark in Japan, other countries, or both), BRAIN, FOUNDATION Fieldbus® (FOUNDATION Fieldbus is a registered trademark in Japan, other countries, or both), or the like. The transceiver 114 may be configured using a communication standard such as Wi-Fi® (Wi-Fi is a registered trademark in Japan, other countries, or both) or ETHERNET® (ETHERNET is a registered trademark in Japan, other countries, or both).

Figure 4:
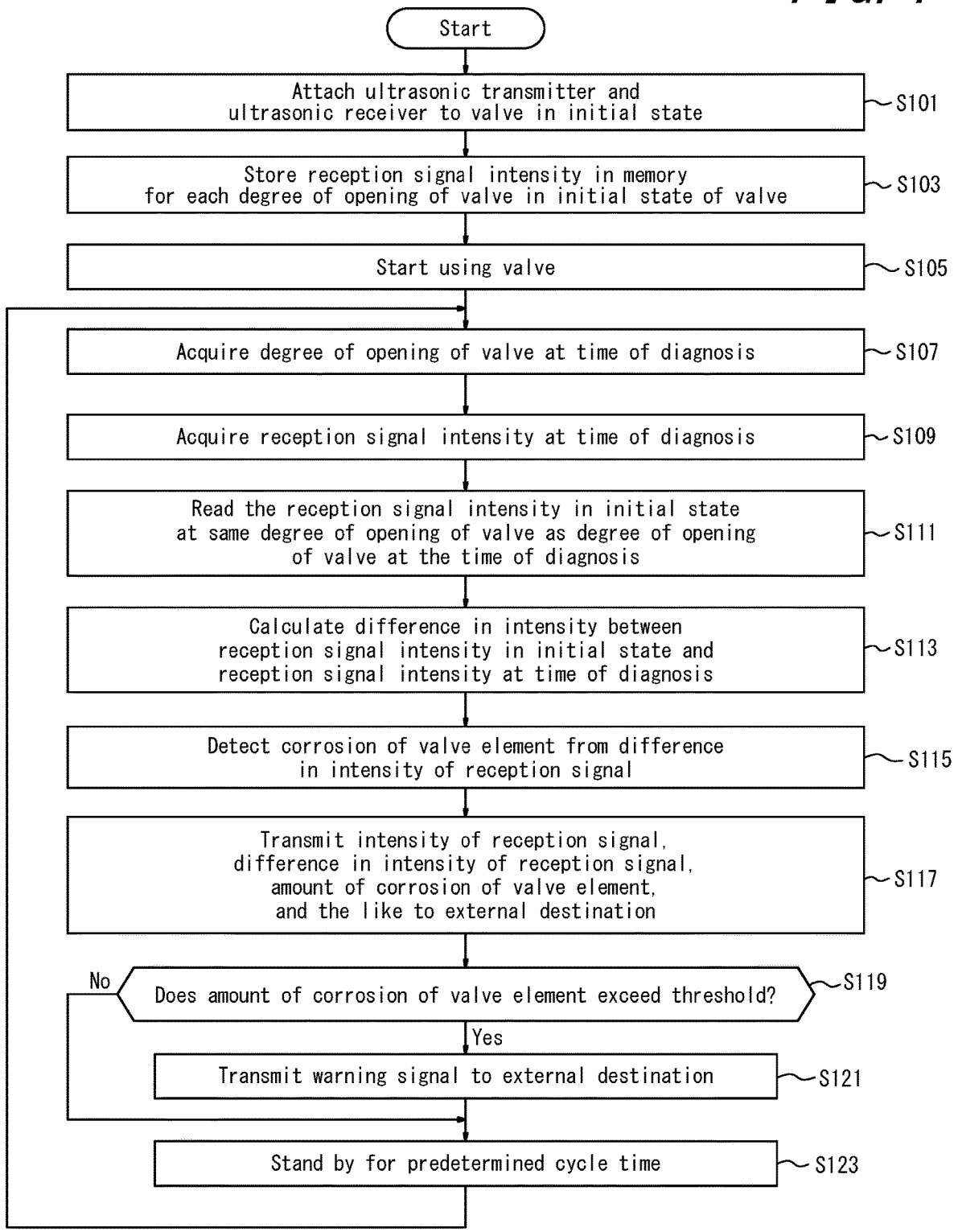
FIG. 4 is a flowchart illustrating the steps for performing valve diagnosis with the valve diagnosis apparatus according to an embodiment of the present disclosure.
Figure 5:
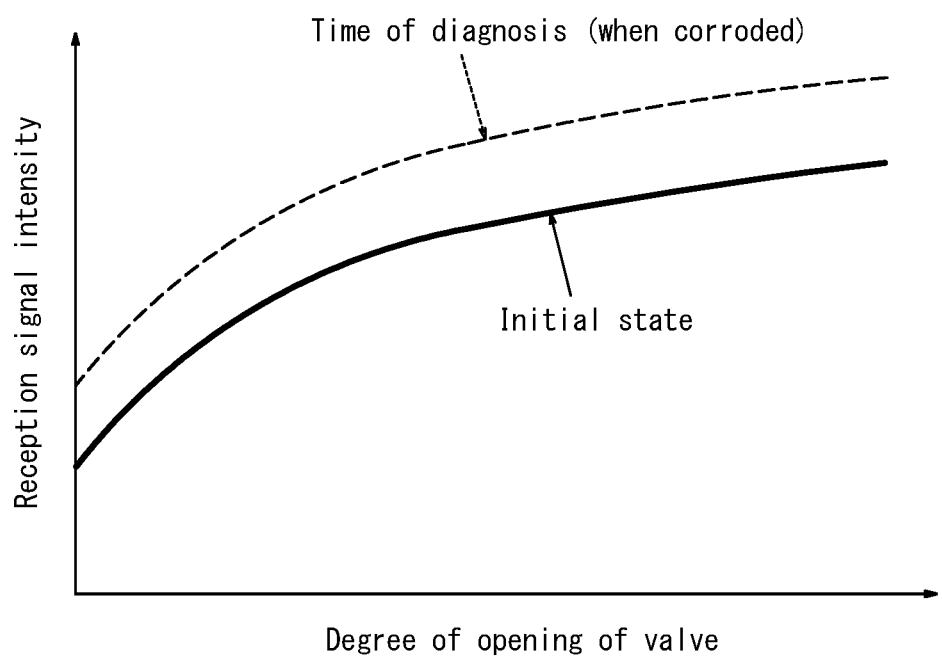
FIG. 5 schematically illustrates the relationship between the reception signal intensity of a signal received by the valve diagnosis apparatus according to an embodiment of the present disclosure and the degree of opening of the valve.

For diagnosis of the valve 100 using the above-described valve diagnosis apparatus 300, the ultrasonic transmitter 104 and the ultrasonic receiver 108 are first mounted on the valve 100 that is in the initial state to configure the valve apparatus 200, as illustrated in FIG. 2 (step S101 of FIG. 4). Next, the controller 102 transmits ultrasound US from the ultrasonic transmitter 104 at each degree of opening of the valve 100 and stores the reception signal intensity of the signal received by the ultrasonic receiver 108 in the memory 112 (step S103). FIG. 5 illustrates the relationship between the degree of opening of the valve 100 and the reception signal intensity of the signal received by the ultrasonic receiver 108 (the initial state recorded in step S103 is indicated by a solid line). Since the needle 12 is tapered towards the bottom, a greater degree of opening of the valve 100 (i.e. as the valve element 10 moves upward in FIG. 2) decreases the proportion of ultrasound US that is reflected at the needle 12 among the ultrasound US transmitted from the ultrasonic transmitter 104. Accordingly, the intensity of the signal received by the ultrasonic receiver 108 increases as the degree of opening of the valve 100 increases, as illustrated in FIG. 5. The recorded data of the reception signal intensity in the initial state of the valve 100 may be data of the degree of opening of the valve 100 and the reception signal intensity, or coefficients of an approximate curve calculated from data of the degree of opening of the valve 100 and the reception signal intensity, for each degree of opening of the measured valve 100.

Next, fluid is caused to flow in the valve 100, and use of the valve 100 begins (step S105). The controller 102 diagnoses the valve 100 with the valve diagnosis apparatus 300 each time a predetermined cycle time elapses. During diagnosis of the valve 100, the controller 102 first acquires information on the degree of opening of the valve 100 at the time of diagnosis (step S107). Next, the controller 102 transmits ultrasound US from the ultrasonic transmitter 104, acquires the reception signal intensity and the like of the signal received by the ultrasonic receiver 108 (step S109), and stores the received information in the memory 112. In FIG. 5, the reception signal intensity at the time of diagnosis, acquired in step S109, is indicated with a dashed line. The width of the needle 12 is less than it was in the initial state when the fluid has caused corrosion. Therefore, among the ultrasound US transmitted from the ultrasonic transmitter 104, the intensity of the signal received by the ultrasonic receiver 108 is greater than in the initial state, as illustrated in FIG. 5. Next, the controller 102 reads data, from the memory 112, of the reception signal intensity in the initial state at the same degree of opening of the valve 100 as the degree of opening of the valve 100 acquired in step S107 (step S111). The controller 102 calculates the difference in intensity between the reception signal intensity at the time of diagnosis, received in step S109, and the reception signal intensity in the initial state (step S113). The controller 102 detects corrosion of the valve element 10 of the valve 100 from the difference in intensity of the reception signal, as calculated in step S113 (step S115). The corrosion of the valve element 10 is detected using data indicating the relationship between the difference in intensity of the reception signal and the amount of corrosion of the valve element 10 for each degree of opening of the valve 100. This data is created in advance using the same type of valve and is stored in the memory 112. The relationship between the difference in intensity of the reception signal and the amount of corrosion of the valve element 10 may be assumed not to depend on the degree of opening of the valve 100, and corrosion of the valve element 10 may be detected only from the relationship between the difference in intensity of the reception signal and the amount of corrosion of the valve element 10. The controller 102 transmits at least one type of data from among the reception signal intensity, the difference in intensity of the reception signal, and the amount of corrosion of the valve element 10 acquired in steps S109, S113, S115 to an external destination via the transceiver 114 (step S117). The destination of the data in this case is a management server that manages the valve 100, a manager's terminal, or the like. The difference in intensity of the reception signal in step S113, the detection of corrosion of the valve element 10 in step S115, and the like may be performed by an external server, terminal, or the like. In this case, the external server, terminal, or the like is also included in the valve diagnosis apparatus 300. The memory 112 may also be provided in an external server, terminal, or the like. When the amount of corrosion of the valve element 10, acquired in step S115, exceeds a predetermined threshold (step S119: Yes), the controller 102 transmits a warning signal to an external destination via the transceiver 114 (step S121). The controller 102 stands by for a predetermined cycle time (step S123) and then again diagnoses the valve 100 in step S107. When the amount of corrosion of the valve element 10, acquired in step S115, does not exceed a predetermined threshold (step S119: No), the controller 102 proceeds to step S123 without executing step S121.

The information transmitted to the management server or the like regarding the type, period of use, reception signal intensity, difference in intensity of the reception signal, amount of corrosion of the valve element 10, and the like of the valve 100 may be used to correct the diagnosis results of other valves of the same type with a similar usage environment and to predict the time to replace parts in other valves of the same type. For example, when the valve to be diagnosed begins to be diagnosed not in a new state but rather after use, the amount of corrosion of the valve element of the valve to be diagnosed may be corrected based on correlation data or the like between the period of use of the valve to be diagnosed and the period of use and amount of corrosion of other valves.

Figure 6:
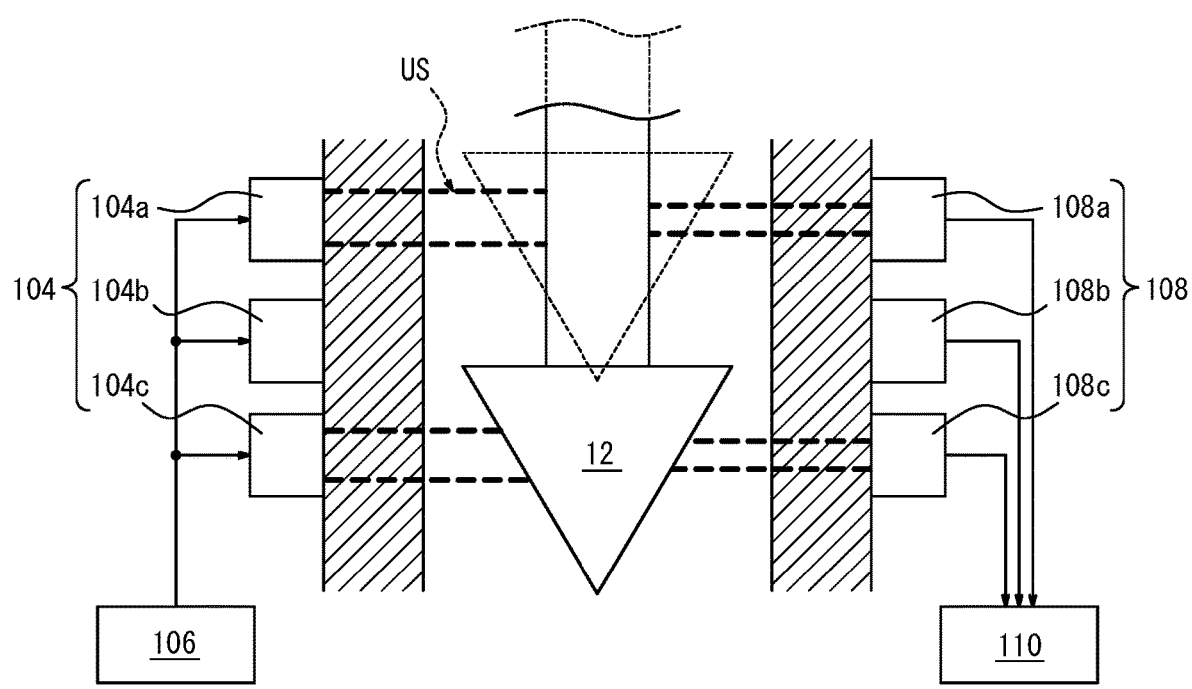
FIG. 6 illustrates the configuration of a modification to an ultrasonic transmitter and an ultrasonic receiver in the valve diagnosis apparatus according to an embodiment of the present disclosure.

FIG. 6 illustrates a modification to the valve diagnosis apparatus 300 according to the present embodiment. This modification includes three sets of ultrasonic transmitters 104*a*, 104*b*, 104*c* and ultrasonic receivers 108*a*, 108*b*, 108*c* rather than the single set of the ultrasonic transmitter 104 and the ultrasonic receiver 108 illustrated in FIG. 2. The three ultrasonic transmitters 104*a*, 104*b*, 104*c* are adjacent in the vertical direction. The three ultrasonic receivers 108*a*, 108*b*, 108*c* are similarly adjacent in the vertical direction. The ultrasonic transmitter 104*a* and the ultrasonic receiver 108*a*, the ultrasonic transmitter 104*b* and the ultrasonic receiver 108*b*, and the ultrasonic transmitter 104*c* and the ultrasonic receiver 108*c* are respectively disposed for each set to be at substantially the same height.

In the present modification, the drive unit 106 supplies substantially the same drive voltage to the three ultrasonic transmitters 104*a*, 104*b*, 104*c* based on a drive signal from the controller 102. The signals received by the three ultrasonic receivers 108*a*, 108*b*, 108*c* are independently amplified by the amplifier 110 and processed by the controller 102.

In step S103 of the flowchart in FIG. 4, ultrasound US is transmitted from the ultrasonic transmitters 104*a*, 104*b*, 104*c* at each degree of opening of the valve 100 in the initial state, and the reception signal intensity and the like of each signal received by the ultrasonic receivers 108*a*, 108*b*, 108*c* is stored in the memory 112 in the present modification. Similarly, in step S109, ultrasound US is transmitted from the ultrasonic transmitters 104*a*, 104*b*, 104*c* at the time of diagnosis, and the reception signal intensity and the like of each signal received by the ultrasonic receivers 108*a*, 108*b*, 108*c* is acquired and stored in the memory 112.

In step S113, the controller 102 calculates the difference in intensity between the reception signal intensity at the time of diagnosis, received in step S109, and the reception signal intensity in the initial state. The reception signal intensity from the ultrasonic receiver, among the ultrasonic receivers 108*a*, 108*b*, 108*c*, positioned at the closest height to the height of the needle 12 is used as the reception signal intensity in the initial state and at the time of diagnosis to calculate the difference in intensity. Among the components of the valve element 10, the needle 12 is considered to suffer the most corrosion due to fluid. Furthermore, corrosion of the needle 12 is considered to have the greatest impact on the performance of the valve 100. The reception signal intensity, in the initial state and at the time of diagnosis, used to calculate the difference in intensity of the reception signal is not necessarily limited to the reception signal intensity from one ultrasonic receiver. The reception signal intensity from a plurality of ultrasonic receivers may be used.

As described above, the present embodiment includes the ultrasonic transmitter 104 that transmits ultrasound US towards a valve element 10 that opens and closes the valve 100 to be diagnosed, the ultrasonic receiver 108 that receives the ultrasound US transmitted from the ultrasonic transmitter 104, the controller 102 that drives the ultrasonic transmitter 104 and process a reception signal received by the ultrasonic receiver 108, and the memory 112 that stores the reception signal. The controller 102 detects corrosion of the valve element 10 from the difference in intensity of the reception signal in the initial state of the valve 100 and at the time of diagnosis. This configuration enables detection of the amount of corrosion of the valve element 10 by combining the valve diagnosis apparatus 300 with an existing valve 100. Corrosion of the valve element 10 in a valve already operating in a factory or the like, or in an existing valve product, can therefore be detected automatically. The cost of having operators, in the plant or the like where the valve 100 is used, inspect the valve 100 directly can also be reduced.

In the present embodiment, the memory 112 is configured to store, in advance, the relationship between the degree of opening of the valve 100 and the intensity of the reception signal in the initial state of the valve 100, and the controller 102 is configured to detect corrosion of the valve element 10 from the difference in intensity of the reception signal in the initial state of the valve 100 and at the time of diagnosis with respect to the same degree of opening of the valve 100. The difference in the reception signal intensity between the initial state and the time of diagnosis is thought to correlate with the amount of corrosion of the valve element 10. This configuration enables quantification of this difference in intensity, thereby enabling more accurate detection of the amount of corrosion of the valve element 10.

The present embodiment includes a plurality of ultrasonic transmitters 104a, 104b, 104c and a plurality of ultrasonic receivers 108a, 108b, 108c configured to receive ultrasound transmitted from the plurality of ultrasonic transmitters 104a, 104b, 104c. The memory 112 is configured to store, in advance, a relationship between the degree of opening of the valve 100 and the intensity of a plurality of reception signals from the plurality of ultrasonic receivers 108a, 108b, 108c in the initial state of the valve 100. The controller 102 is configured to detect corrosion of the valve element 10 from the difference in intensity of at least a portion of the plurality of reception signals in the initial state of the valve 100 and at the time of diagnosis with respect to the same degree of opening of the valve 100. This configuration enables selection and use of the reception signal intensity, among the plurality of reception signal intensities from the plurality of ultrasound receivers 108a, 108b, 108c, that is highly correlated with corrosion of the valve element 10. The amount of corrosion of the valve element 10 can therefore be detected more accurately.

In the present embodiment, at least a portion of the plurality of reception signals is a reception signal received by an ultrasonic receiver, among the plurality of ultrasonic receivers 108a, 108b, 108c, closest to the needle 12 of the valve element 10 at the time of diagnosis. This configuration enables selection and use of the reception signal, among the plurality of reception signals from the plurality of ultrasonic receivers 108a, 108b, 108c, that is from the ultrasonic receiver closest to the needle 12, which is thought to be susceptible to corrosion due to fluid. The amount of corrosion of the valve element 10 can therefore be detected more accurately. The reception signal from the ultrasonic receiver closest to a predetermined portion of the valve element 10, other than the needle 12, assumed to suffer corrosion may also be used.

In the present embodiment, the controller 102 is configured to acquire information of the degree of opening of the valve 100 by detecting the vertical position of a portion of the valve element 10 not corroded by fluid. This configuration can reduce the effect of corrosion of the valve element 10 on the information on the opening degree of the valve 100. The amount of corrosion of the valve element 10 can therefore be detected more accurately based on more accurate information on the opening degree of the valve 100.

The present embodiment further includes a data transmitter (transceiver 114) configured to transmit the detection result of corrosion of the valve element 10, and the controller 102 is configured to detect corrosion of the valve element 10 at a predetermined cycle and transmit the detection result from the data transmitter to an external destination. With this configuration, information related to the corrosion of the valve element 10 is periodically transmitted to the manager or the like of the plant. This facilitates maintenance of the plant.

The present embodiment further includes a data transmitter (transceiver 114) configured to transmit information related to corrosion of the valve element 10, and the controller 102 is configured to detect corrosion of the valve element 10 at a predetermined cycle and transmit a warning signal to an external destination from the data transmitter when a detection result exceeds a predetermined threshold. With this configuration, a warning signal indicating that the amount of corrosion of the valve element 10 has exceeded a predetermined amount is transmitted to the manager or the like of the plant, enabling the manager to learn of an abnormality in the plant quickly.

The valve apparatus 200 according to the present embodiment includes the valve 100 configured to control flow of a fluid by movement of the valve element 10, the ultrasonic transmitter 104 configured to transmit ultrasound US towards the valve element 10, the ultrasonic receiver 108 configured to receive the ultrasound US transmitted from the ultrasonic transmitter 104, the controller 102 configured to drive the ultrasonic transmitter 104 and process a reception signal received by the ultrasonic receiver 108, and the memory 112 configured to store the reception signal. The controller 102 is configured to detect corrosion of the valve element 10 from the difference in intensity of the reception signal in the initial state of the valve and at the time of diagnosis. This configuration enables automatic diagnosis of corrosion of the valve element 10 in the valve 100. The cost of having operators, in the plant or the like where the valve 100 is used, inspect the valve 100 directly can also be reduced.

In the present embodiment, the valve 100 is a needle-type valve including the tapered valve element 10. This configuration enables a portion of the ultrasound transmitted towards the needle 12 of the valve element 10 to be reflected by the needle 12 while another portion passes by along the front and back sides of the needle 12 and is received by the ultrasonic receiver 108. Accordingly, a reception signal corresponding to the size of the needle 12 as viewed in the front-back direction (the direction perpendicular to the paper in FIG. 2) can be received by the ultrasonic receiver 108. The amount of corrosion of the valve element 10 can therefore be detected more accurately from the reception signal intensity.

A valve diagnosis method according to the present embodiment includes receiving ultrasound US transmitted towards the valve element 10 and storing the intensity of the reception signal in the initial state of the valve 100, receiving ultrasound US transmitted towards the valve element 10 and acquiring the intensity of the reception signal at the time of diagnosis of the valve 100, calculating the difference in intensity of the reception signal in the initial state of the valve 100 and at the time of diagnosis, and detecting corrosion of the valve element 10 from the difference in intensity of the reception signal. This configuration enables automatic diagnosis of corrosion of the valve element 10 in the valve 100. The cost of having operators, in the plant or the like where the valve 100 is used, inspect the valve 100 directly can also be reduced.

The present disclosure is based on the drawings and on examples, but it should be noted that a person of ordinary skill in the art could easily make a variety of modifications and adjustments on the basis of the present disclosure. Therefore, such changes and modifications are to be understood as included within the scope of the disclosure. For example, the functions and the like included in the various components may be reordered in any logically consistent way. Furthermore, components may be combined into one or divided. Such embodiments are also to be understood as falling within the scope of the present disclosure.

For example, in the present embodiment, a needle-type valve is used as the valve 100 to be diagnosed, but this example is not limiting. The valve to be diagnosed in the present disclosure may be another type of valve, such as Multiple Orifice, Plug and Cage, External Sleeve, or the like. Any other type of valve may be used as long as a portion of the ultrasound US can be reflected by the valve element and another portion can be received by the ultrasonic receiver.

In the present embodiment, the ultrasound US is transmitted towards the needle 12 of the valve element 10, but this example is not limiting. The ultrasound US may be transmitted towards a predetermined portion, other than the needle 12, assumed to suffer corrosion.

In the present embodiment, the ultrasound US is transmitted in the left-right direction that is substantially orthogonal to the flow of fluid, but this example is not limiting. The ultrasound US may be transmitted in another direction that enables detection of corrosion of the valve element 10.

In the present embodiment, a piezoelectric element is used in the ultrasonic transmitter 104 and the ultrasonic receiver 108, but this example is not limiting. A device other than a piezoelectric element may be used for transmission and reception of the ultrasound US.

In the present embodiment, the drive unit 106 is provided between the controller 102 and the ultrasonic transmitter 104, and the amplifier 110 is provided between the ultrasonic receiver 108 and the controller 102, but this example is not limiting. The controller 102 may be configured to drive the ultrasonic transmitter 104 directly and to acquire the reception signal directly from the ultrasonic receiver 108.

In the present embodiment, the memory 112 is provided separately from the controller 102, but this example is not limiting. The reception signal intensity and the like may be stored inside the controller 102.

In the present embodiment, one set of the ultrasonic transmitter 104 and the ultrasonic receiver 108, or three sets of the ultrasonic transmitter 104a, 104b, 104c, and the ultrasonic receiver 108a, 108b, 108c are used, but these examples are not limiting. Two sets, or four or more sets, of the ultrasonic transmitter 104 and the ultrasonic receiver 108 may be provided. The number of ultrasonic transmitters 104 and ultrasonic receivers 108 may also differ. For example, one ultrasonic transmitter 104 and three ultrasonic receivers 108 may be combined and used as a set. The height positions of the ultrasonic transmitter 104 and the ultrasonic receiver 108 do not necessarily need to be aligned.

In the present embodiment, the absolute value of the reception signal intensity is used to detect corrosion of the valve element 10, but this example is not limiting. The ratio between the transmission signal intensity (proportional to the drive voltage in the drive unit 106) of the ultrasound US from the ultrasonic transmitter 104 and the reception signal intensity of the ultrasound in the ultrasonic receiver 108 may be used to detect corrosion of the valve element 10.

The invention claimed is:

1. A valve diagnosis apparatus comprising:
an ultrasonic transmitter configured to transmit ultrasound towards a valve element configured to open and close a valve to be diagnosed from a position isolated from the valve element;
an ultrasonic receiver configured to receive the ultrasound transmitted from the ultrasonic transmitter and passing through the valve element at a position isolated from the valve element;
a controller configured to drive the ultrasonic transmitter and process a reception signal received by the ultrasonic receiver; and
a memory configured to store the reception signal;
wherein the controller is configured to detect corrosion of the valve element from a difference in intensity of the reception signal in an initial state of the valve and at a time of diagnosis.

2. The valve diagnosis apparatus of claim 1,
wherein the memory is configured to store, in advance, a relationship between a degree of opening of the valve and an intensity of the reception signal in the initial state of the valve; and
wherein the controller is configured to detect corrosion of the valve element from a difference in intensity of the reception signal in the initial state of the valve and at the time of diagnosis with respect to the same degree of opening of the valve.

3. The valve diagnosis apparatus of claim 2, further comprising:
a plurality of ultrasonic transmitters and a plurality of ultrasonic receivers configured to receive ultrasound transmitted from the plurality of ultrasonic transmitters;
wherein the memory is configured to store, in advance, a relationship between a degree of opening of the valve and an intensity of a plurality of reception signals from the plurality of ultrasonic receivers in the initial state of the valve; and
wherein the controller is configured to detect corrosion of the valve element from a difference in intensity of at least a portion of the plurality of reception signals in the initial state of the valve and at the time of diagnosis with respect to the same degree of opening of the valve.

4. The valve diagnosis apparatus of claim 3, wherein the at least a portion of the plurality of reception signals is a reception signal received by an ultrasonic receiver, among the plurality of ultrasonic receivers, closest to a predetermined portion of the valve element at the time of diagnosis.

5. The valve diagnosis apparatus of claim 2, wherein the controller is configured to acquire information of the degree of opening of the valve by detecting a vertical position of a portion of the valve element not corroded by fluid.

6. The valve diagnosis apparatus of claim 1, further comprising:

a data transmitter configured to transmit a detection result of corrosion of the valve element;
wherein the controller is configured to detect corrosion of the valve element at a predetermined cycle and transmit the detection result from the data transmitter to an external destination.

7. The valve diagnosis apparatus of claim 1, further comprising:
a data transmitter configured to transmit information related to corrosion of the valve element;
wherein the controller is configured to detect corrosion of the valve element at a predetermined cycle and transmit a warning signal to an external destination from the data transmitter when a detection result exceeds a predetermined threshold.

8. A valve apparatus comprising:
a valve configured to control flow of a fluid by movement of a valve element;
an ultrasonic transmitter configured to transmit ultrasound towards the valve element from a position isolated from the valve element;
an ultrasonic receiver configured to receive the ultrasound transmitted from the ultrasonic transmitter and passing through the valve element at a position isolated from the valve element;
a controller configured to drive the ultrasonic transmitter and process a reception signal received by the ultrasonic receiver; and
a memory configured to store the reception signal;
wherein the controller is configured to detect corrosion of the valve element from a difference in intensity of the reception signal in an initial state of the valve and at a time of diagnosis.

9. The valve apparatus of claim 8, wherein the valve is a needle-type valve comprising a tapered valve element.

10. A valve diagnosis method comprising:
receiving, at a position isolated from a valve element ultrasound transmitted from a position isolated from the valve element towards the valve element and passing through the valve element, and storing an intensity of a reception signal in an initial state of the valve;
receiving, at a position isolated from the valve element ultrasound transmitted from a position isolated from the valve element towards the valve element and passing through the valve element, and acquiring an intensity of a reception signal at a time of diagnosis of the valve;
calculating a difference in intensity of the reception signal in the initial state of the valve and at the time of diagnosis; and
detecting corrosion of the valve element from the difference in intensity of the reception signal.

11. The valve diagnosis apparatus of claim 3, wherein the controller is configured to acquire information of the degree of opening of the valve by detecting a vertical position of a portion of the valve element not corroded by fluid.

12. The valve diagnosis apparatus of claim 4, wherein the controller is configured to acquire information of the degree of opening of the valve by detecting a vertical position of a portion of the valve element not corroded by fluid.

13. The valve diagnosis apparatus of claim 2, further comprising:
a data transmitter configured to transmit a detection result of corrosion of the valve element;
wherein the controller is configured to detect corrosion of the valve element at a predetermined cycle and transmit the detection result from the data transmitter to an external destination.

14. The valve diagnosis apparatus of claim 3, further comprising:
a data transmitter configured to transmit a detection result of corrosion of the valve element;
wherein the controller is configured to detect corrosion of the valve element at a predetermined cycle and transmit the detection result from the data transmitter to an external destination.

15. The valve diagnosis apparatus of claim 4, further comprising:
a data transmitter configured to transmit a detection result of corrosion of the valve element;
wherein the controller is configured to detect corrosion of the valve element at a predetermined cycle and transmit the detection result from the data transmitter to an external destination.

16. The valve diagnosis apparatus of claim 5, further comprising:
a data transmitter configured to transmit a detection result of corrosion of the valve element;
wherein the controller is configured to detect corrosion of the valve element at a predetermined cycle and transmit the detection result from the data transmitter to an external destination.

17. The valve diagnosis apparatus of claim 2, further comprising:
a data transmitter configured to transmit information related to corrosion of the valve element;
wherein the controller is configured to detect corrosion of the valve element at a predetermined cycle and transmit a warning signal to an external destination from the data transmitter when a detection result exceeds a predetermined threshold.

18. The valve diagnosis apparatus of claim 3, further comprising:
a data transmitter configured to transmit information related to corrosion of the valve element;
wherein the controller is configured to detect corrosion of the valve element at a predetermined cycle and transmit a warning signal to an external destination from the data transmitter when a detection result exceeds a predetermined threshold.

19. The valve diagnosis apparatus of claim 4, further comprising:
a data transmitter configured to transmit information related to corrosion of the valve element;
wherein the controller is configured to detect corrosion of the valve element at a predetermined cycle and transmit a warning signal to an external destination from the data transmitter when a detection result exceeds a predetermined threshold.

20. The valve diagnosis apparatus of claim 5, further comprising:
a data transmitter configured to transmit information related to corrosion of the valve element;
wherein the controller is configured to detect corrosion of the valve element at a predetermined cycle and transmit a warning signal to an external destination from the data transmitter when a detection result exceeds a predetermined threshold.

\* \* \* \* \*